United States Patent [19]

Takahashi et al.

[11] Patent Number: 4,594,983
[45] Date of Patent: Jun. 17, 1986

[54] ENGINE OPERATING PARAMETER CONTROL APPARATUS

[75] Inventors: Akira Takahashi; Yoshiaki Danno, both of Kyoto; Toshio Iwata, Himeji; Atsushi Ueda, Himeji; Takeo Sasaki, Himeji, all of Japan

[73] Assignees: Mitsubishi Jidosha Kabushiki Kaisha; Mitsubishi Denki Kabushiki Kaisha, both of Tokyo, Japan

[21] Appl. No.: 694,256

[22] Filed: Jan. 24, 1985

[30] Foreign Application Priority Data

Feb. 2, 1984 [JP] Japan .................................. 59-18536

[51] Int. Cl.$^4$ ............................................... F02P 5/15
[52] U.S. Cl. ....................................... 123/425; 60/602; 123/435
[58] Field of Search ......................... 123/425, 435, 564; 60/602; 73/35

[56] References Cited

U.S. PATENT DOCUMENTS 3,822,583 7/1974 Keller et al. .
4,243,007 1/1981 Ehrhardt et al. ................... 123/419
4,463,565 8/1984 Rydquist et al. ............... 123/425 X

FOREIGN PATENT DOCUMENTS 143169 8/1983 Japan .................................. 123/425

Primary Examiner—Tony M. Argenbright
Attorney, Agent, or Firm—Leydig, Voit & Mayer, Ltd.

[57] ABSTRACT

A control apparatus for an internal combustion engine capable of using as a fuel a regular (low-octane) gasoline, a premium (high-octane) gasoline, or a mixture of both type of gasolines. The engine produces knocks when the ignition timing is advanced beyond a reference ignition timing determined as a function of the type of gasoline being used. This ignition timing control apparatus detects the knocks, and provides as an output therefrom a signal according to the occurrence rate of the knocks which essentially indicates the type of gasoline in use. By means of this signal, this ignition timing control apparatus continuously displaces the reference ignition timing in the direction of retard angle by using a proportion factor calculator and an interpolator. At the same time, the displaced reference ignition timing is corrected by the detected knock signals on a real time basis. In addition to the ignition timing control, an operating parameter for the engine such as a supercharging pressure, a compression ratio, or an air/fuel ratio is controlled to suppress knocks by the displaced reference control value and/or the corrected control value. The combined ignition timing signal and operating parameter signal serve to energize an ignition coil and an actuator to suppress the occurrence of knocks. This operation will continue until no knocks occur.

15 Claims, 24 Drawing Figures

ENGINE OPERATING PARAMETER CONTROL APPARATUS

BACKGROUND OF THE INVENTION

This invention relates to a control apparatus for an internal combustion engine, and in particular to a control apparatus for an internal combustion engine which is operable either with a low-octane rating fuel or a high-octane rating fuel.

It is well known in the art that the octane rating of fuel gasoline is greatly interrelated with a knock-resistibility in an internal combustion engine. Namely, as the octane rating of gasoline becomes higher, the knocking of an engine correspondingly decreases.

FIG. 1 shows an ignition timing vs output shaft torque characteristic in an internal combustion engine in the case where a commercially available low-octane gasoline (regular gasoline) and a commercially available high octane gasoline (premium gasoline) of which the octane rating is higher than that of the low-octane gasoline. In the figure, point A indicates a knock limit for the low-octane gasoline while point B indicates a knock limit for the high-octane gasoline, in which knock arises when the angle of the ignition timing is advanced beyond these points. According to FIG. 1, it is possible to advance the angle of the ignition timing up to a point B if the high-octane gasoline is used, where the output shaft torque will be higher as compared with the use of the low-octane gasoline.

FIG. 2 shows a supercharging pressure vs output shaft torque characteristic of an engine associated with a supercharger. Similar to FIG. 1, point A represents a knock limit when using the regular low-octane gasoline and point B represents a knock limit when using the premium high-octane gasoline. It will be seen from FIG. 2 that the increase of a supercharging pressure when the premium gasoline is used for the engine enables the output shaft torque of the engine to be also increased as in FIG. 1. Therefore, in an engine associated with such a characteristic supercharger, if the ignition timing and the supercharging pressure are advanced and increased respectively according to the mixing ratio of the regular gasoline and the premium gasoline in the case where their mixture is used or either one is used, the output of the engine can be enhanced.

However, in a conventional ignition timing control apparatus for an internal combustion engine, the reference ignition timing characteristic is preset only for a predetermined gasoline, e.g. the low-octane rating gasoline. Therefore when using the high-octane rating gasoline, an increase in the output of the engine cannot be expected without any change or modification of the reference ignition timing characteristic or the reference supercharging characteristic, so that by some method, the presetting of the reference ignition timing must be repeated towards the advance angle or the presetting of the supercharging pressure must be repeated towards the high pressure.

Particularly, such a repeated presetting of the reference ignition timing is very hard when using the mixed fuel because, as shown in FIGS. 1 and 2 by point C, the knock limit exists between points A and B according to the mixture ratio and so the possible advance limit or the possible increased pressure limit is variable.

Even if the reference ignition timing or the supercharging pressure has been again preset at the knock limits A and B, since the knock limits A and B in FIG. 1 may vary with environmental conditions during the operation of the engine such as temperature, humidity, etc., knocks easily arise at the time of a transient operation such as an accelerated operation of the engine, and accordingly it is quite difficult to avoid the occurrence of engine knocks.

U.S. Pat. No. 3,822,583, titled "Method for Determining Octane Ratings of Fuels under Road Conditions" issued on July 9, 1974 to B. D. Keller et al. discloses a basic ignition timing control according to the octane rating of gasoline by a knock detection.

SUMMARY OF THE INVENTION

It is a general object of the invention to provide a control apparatus for an internal combustion engine wherein the occurrence of knocks is detected, and a reference ignition timing displacement magnitude indicating the mixture ratio of a high-octane rating fuel and a low-octane rating fuel is determined according to the detected value, on the basis of which the reference ignition timing is set in the advance angle or retard angle direction and the reference operating parameter is set in the increased value or reduced value, whereby the mixture ratio is determined to continuously adjust the reference ignition timing and the reference operating parameter value to an optimum angle. At the same time, the occurrence of knock is immediately suppressed by controlling the ignition timing in the direction of retard angle and the operating parameter value on the real time basis when knock arises at the time of a rapid variation of an environmental condition during the steady state engine operation or at the time of a transient operation.

In order to accomplish this object, the present invention, broadly in one aspect, provides a control apparatus for an internal combustion engine comprising: a sensing means for sensing vibrations including knocks in the engine; a knock signal deriving means, responsive to the output of the sensing means, for deriving the knock signals; means for generating reference ignition timing signals; a correction magnitude determining means for determining an ignition timing correction magnitude for suppressing the occurrence of knock from the output of the knock signal deriving means; a displacement magnitude determining means for determining from the output of the knock signal deriving means or the output of the correction magnitude determining means a displacement magnitude for the reference ignition timing corresponding to the octane rating of a fuel used in the engine; an ignition timing determining means responsive to the outputs of the correction magnitude determining means and the displacement magnitude determining means to determine an ignition timing of the engine; and, operating parameter control means for controlling the operating paramter in addition to the ignition timing of the engine in response to the output of the correction magnitude determining means and the output of the displacement magnitude determining means.

The operating paramters for the engine preferably comprises a supercharging pressure, a compression ratio, and an air/fuel ratio.

BRIEF DESCRIPTION OF THE DRAWINGS

Throughout the figures, the same reference numerals indicate identical or corresponding portions and element.

DETAILED DESCRIPTION OF THE PREFERRED EMBODIMENTS

The present invention will now be described in detail along the preferred embodiments illustrated in the accompanying drawings.

Figure 3:
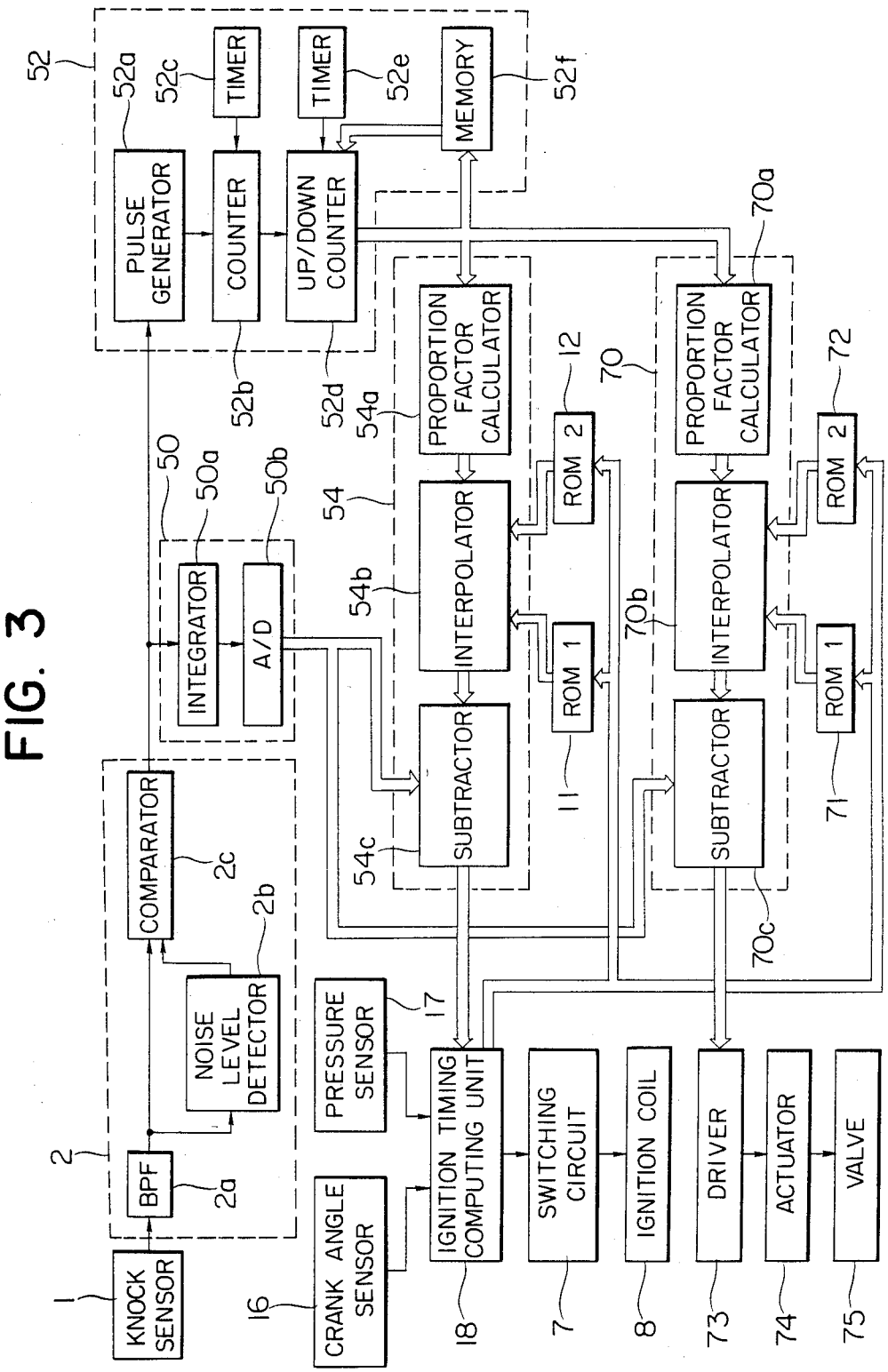
FIG. 3 shows a block diagram of a first embodiment of a control apparatus for an internal combustion engine in accordance with this invention.

FIG. 3 shows a circuit diagram of a first embodiment of a continuous ignition timing control apparatus for an internal combustion engine in accordance with this invention. In the figure, a knock sensor 1 is mounted on an internal combustion engine (not shown) to sense knocks of the engine. The output signal of the knock sensor 1 is received by a knock signal deriving portion 2, enclosed with dotted lines, which is composed of a bandpass-filter 2a, a noise level detector 2b, and a comparator 2c. The input of the bandpass filter 2a is connected to the knock sensor 1 and the output thereof is connected to the noise level detector 2b and one input of the comparator 2c. The output of the noise level detector 2b is connected to the other input of the comparator 2c.

The comparator 2c of the knock signal deriving portion 2 is connected to a retard angle control magnitude determining portion 50 and a reference ignition timing displacement magnitude determining portion 52. The retard angle control magnitude determining portion 50 includes an integrator 50a and an analog to digital (A/D) converter 50b. The reference ignition timing displacement magnitude determining portion 52 is formed of a pulse generator 52a, a counter 52a, a timer 52c, an up/down counter 52d, a timer 52e, and a memory 52f. The input of the pulse generator 52a is connected to the output of the comparator 2c and the output thereof is connected to the input of the counter 52b. The timer 52c is connected to the reset input of the counter 52b. The up-count input of the up/down counter 52d is connected to the output of the counter 52b and the down-count input thereof is connected to the timer 52e. The data input of the memory 52f is connected to the output of the up/down counter 52d and the data output thereof is connected to the preset input of the up/down counter 52d.

A first ignition timing computing unit 54 is formed of a proportion factor calculator 54a, an interpolator 54b, and a subtractor 54c. The proportion factor calculator 54a is connected to the output of the up/down counter 52d to convert the count of the up/down counter 52d into a proportion factor. The interpolator 54b is connected to the output of ROM's 11 and 12 as well as the output of the calculator 54a so that an interpolation is performed according to the proportion factor provided from the calculator 54a between the output data of the ROM's 11 and 12, thereby providing as an output an ignition timing data determined by the interpolation. The subtractor 54c has two inputs, one of which is connected to the output of the interpolator 54b and the other of which is connected to the output of the A/D converter 50b, and subtracts the output value of the A/D converter 50b from the ignition timing data from the interpolator 54b to provide an ignition timing data output, which is shifted in the retard direction, to a second ignition timing computing unit 18.

Figure 4:
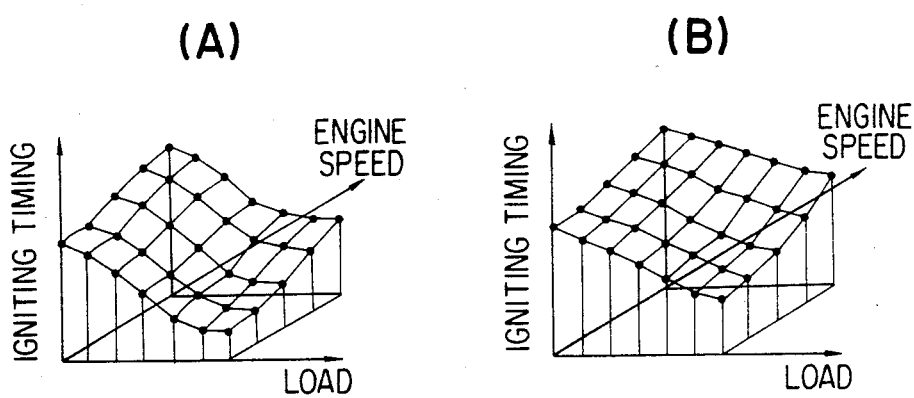
FIGS. 4(A) and 4(B) show maps of ignition timing (supercharging pressure) characteristics stored in a memory, depending on the octane rating of a fuel.

The ROM's 11 and 12 which are first and second ignition timing characteristic memory portions have stored therein ignition timing data at corresponding memory addresses determined by an engine speed and a load condition as illustrated in FIGS. 4(A) and 4(B). FIG. 4(A) shows data of the ROM 11 set for the low-octane gasoline while FIG. 4(B) shows data of the ROM 12, set for the high-octane gasoline, positioned in the side of advance angle in relation to FIG. 4(A).

A crank angle sensor 16 detects the crank rotational angle of the engine, and a pressure sensor 17 detects an intake air pressure of the engine. The above noted ignition timing computing unit 18 computes the engine speed from the output signal of the crank angle sensor 16, determines the load condition of the engine from the output signal of the pressure sensor 17, and converts the value determined by the engine speed and the load condition into an address value, which is sent to the ROM's 11 and 12. The ignition timing computing unit 18 also reads out the output data of the subtractor 54c, computes the ignition timing from the output data of the subtractor 54c on the basis of the output signal of the crank angle sensor 16, and sends the ignition signal to a switching circuit 7 and then an ignition coil 8. The switching circuit 7 energizes or deenergizes an ignition coil 8 in synchronization with the output signal of the computing unit 18 to produce a high voltage necessary for the ignition of the engine.

In addition to the above mentioned ignition timing control arrangement, supercharging pressure is reduced to suppress the occurrence of knocks by means of a supercharging pressure controller 70, ROM's 71 and 72, a driver 73, an actuator 74, and a waste gate valve 75.

The supercharging pressure controller 70 performs the same operation as the first ignition timing computing unit 54, and comprises a proportion factor calculator 70a, an interpolator 70b, and a subtractor 70c which respectively perform the same function as the proportion factor calculator 54a, the interpolator 54b, and the subtractor 54c of the unit 54. The input of the proportion factor calculator 70a is connected to the output of the up/down counter 52d and the output thereof is connected to the subtractor 70c through the interpolator 70b, which intern has two inputs, one of which is connected to the ROM 71 and the other of which is connected to the ROM 72. The inputs of the ROM's 71 and 72 are commonly connected to the output of the second ignition timing computing unit 18. The other input of the subtractor 70c is connected to the output of the A/D converter 50b, and the output of the subtractor 70c is connected to the driver 73.

The ROM's 71 and 72 have stored therein supercharging pressure characteristic data, determined by engine speed and engine load, adapted for the premium gasoline and the regular gasoline, respectively like FIGS. 4(A) and 4(B).

The input signal from the A/D converter 50b to the subtractor 70c serves not only as a retard control angle signal but also as a control voltage signal for the purpose of reducing the supercharging pressure, with an ignition timing indicative signal corresponding to a certain supercharging pressure indicative signal, and the input signal from the up/down counter 52d to the proportion factor calculator 70a serves not only as a displacement magnitude for the reference ignition timing but also as a displacement magnitude for reducing the reference supercharging pressure, with an ignition timing indicative signal corresponding to a certain supercharging pressure indicative signal.

Figure 5:
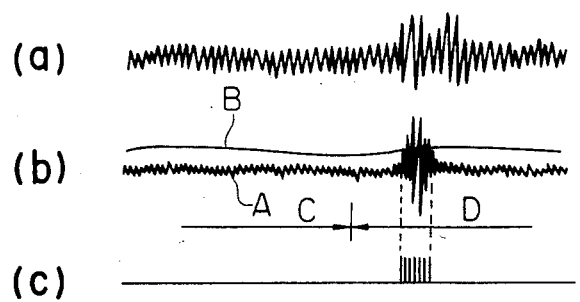
FIGS. 5(a)-(c) show waveform graphs for explaining the operation of the knock signal deriving portion in FIG. 3.
Figure 6:
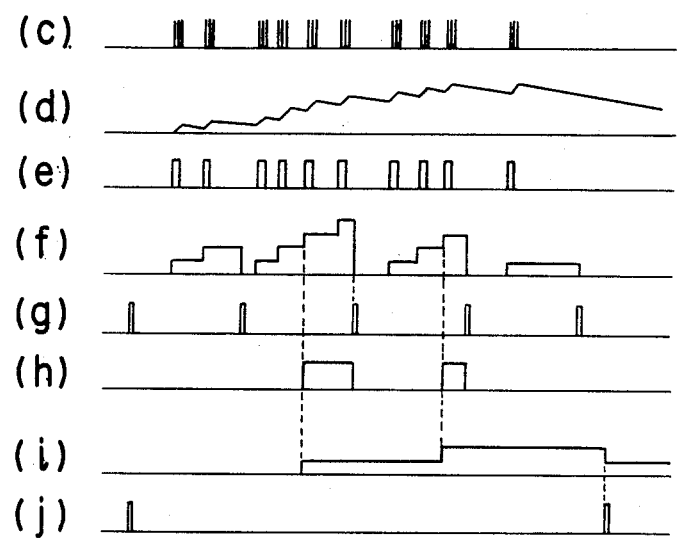
FIGS. 6(c)-(j) show waveform diagrams taken out of the various places of the retard angle control magnitude determining portion and the reference ignition timing displacement magnitude determining portion shown in FIG. 3.

The operation of each of the block portions will now be described with reference to FIGS. 5 and 6. FIG. 5 shows waveforms indicating the operation of each of the circuits in the knock signal deriving portion 2, and FIG. 6 shows waveforms indicating the operation of each of the circuits in the portions 50 and 52.

The knock sensor 1 is a vibration acceleration sensor generally well known as being mounted on the cylinder block (not shown) etc., of an engine, which converts the mechanical vibration into an electrical signal, and generates a vibrating wave signal, as shown in FIG. 5(a), received by the bandpass filter 2a. The bandpass filter 2a only passes therethrough a frequency component inherent in knocks, from the output signal of the knock sensor 1, thereby suppressing a noise component not relating to knocks to provide an output good in S/N ratio as shown in FIG. 5(b) by wave-form A.

The noise level detector 2b may be composed of, e.g. a half-wave rectifying circuit, an averaging circuit, and an amplifying circuit etc. The noise level detector 2b converts the output of the bandpass filter 2a (FIG. 5(b), wave-form A) into a DC voltage by the half-wave rectification and the averaging operations, the DC voltage being amplified with a predetermined amplification to have a level, as shown in FIG. 5(b) by a wave-form B, higher than the noise component of the output signal of the bandpass filter 2a (FIG. 5(b), wave-form A) but lower than the knock component of the same.

The comparator 2c compares the output signal of the noise level detector 2b (FIG. 5(b), wave-form B) with the output of the bandpass filter 2a (FIG. 5(b), wave-form A). In the case where no knock occurs (FIG. 5, section C), since the output signal of the bandpass filter 2a (FIG. 5(b), wave-form A) is not greater than the output signal of the noise level detector 2b (FIG. 5(b), wave-form B), the comparator 2c provides no output, while in the case where knocks occur (FIG. 5(b), section D), since the former signal is greater than the latter signal, the comparator 2c provides as an output a pulse train as shown in FIG. 5(c). Accordingly, the output pulse train from the comparator 2c can be used for determining whether or not knocks have occurred.

When the knock signal deriving portion 2 derives knock signals as shown in FIG. 5(c), the comparator 2c provides as an output a pulse train as shown in FIG. 6(c). As shown in FIG. 6(d), the pulse train shown in FIG. 6(c) is integrated by the integrator 50a to provide as an output therefrom an integrated voltage. The output voltage of the integrator 50a through the A/D converter 50b serves as a control voltage to retard the angle of the ignition timing by means of the first and second ignition timing computing unit 54 and 18 and to reduce the supercharging pressure by means of the supercharging control portion 70. Namely, upon the occurrence of knocks the pulse train output of the compartor 2c causes the output voltage of the integrator 50a to be increased to retard the ignition timing and to reduce the supercharging pressure, thereby suppressing the occurrence of knocks on the real time basis. On the other hand, when knock ceases, the output voltage of the integrator 50a decreases to return the ignition timing toward the advance angle and increase the supercharging pressure.

Therefore, the retard angle control magnitude determining portion 50, as shown in FIG. 6(d) by the output of the integrator 50a, forms a closed loop control system for retarding the angle of the ignition timing up to the knock limit point on the real time basis in response to the occurrence of knocks. While the rising rate or the falling rate of the output voltage of the integrator 50a is dependent upon the responsiveness in the retardation of the ignition timing and the reduction of the supercharging pressure or the stability of the closed loop control, it is set at a relatively high responsiveness because of the requirements of immediate response to knocks.

The displacement magnitude determining portion 52 serves to determine a displacement magnitude from the reference ignition timing and the reference supercharging pressure according to the occurrence rate of knocks. The pulse generator 52a receives as an input the pulse train output (FIG. 6(c) from the comparator 2c and then provides output pulses (FIG. 6(e)). That is to say, the pulse generator 52a provides one output pulse in response to a knock which occurs during one ignition. The output pulses of the pulse generator 52a are counted by the counter 52b, the count value being shown in FIG. 6(f). The timer 52c provides one output pulse (FIG. 6(g)) per a predetermined time interval to the counter 52b whose count is reset to zero by the output pulse of the timer 52c. The output of the counter 52b becomes a logic high level when the count value of the counter 52b exceeds a predetermined value which is "count 3" in this case, as shown in FIG. 6(h). This means that when a predetermined number of knocks have occurred within a predetermined time interval, i.e. the occurrence rate of knocks has exceeded a predetermined value, the counter 52b provides a high level output signal.

The up/down counter 52d counts up by one when the output of the counter 52b has a logical transition from the low level "0" to the high level "1". The timer 52e provides one output pulse per a predetermined time interval as shown in FIG. 6(j) to the up/down counter 52d which is counted-down by one by the output of the timer 52e. The count of the up/down counter 52d is shown in FIG. 6(i).

The memory 52f stores the count of the up/down counter 52d at the time of the ignition switch being turned off or at the time of a reduction in the power source voltage, while presetting the stored count as the count of the up/down counter 52d. Namely, even if the engine is stopped, the memory 52f enables a displacement magnitude of the reference ignition timing and the reference supercharging pressure to be retained.

Thus, the reference ignition timing displacement magnitude determining portion 52 determines the occurrence rate of knocks and then produces a displacement magnitude to retard the reference ignition timing and to reduce the reference supercharging pressure by the output of the up/down counter 52d if the occurrence rate of knocks exceeds a predetermined value while the displacement magnitude is shifted toward the advance angle and the increased supecharging pressure if the displacement magnitude is not shifted toward the retard angle and the reduced supercharging pressure respectively within a predetermined time interval.

Therefore, the displacement magnitude determining portion 52, similar to the retard angle control magnitude determining portion 50, also forms a closed loop control system for retarding/advancing the ignition timing and reducing/increasing the supercharging pressure according to the occurrence of knocks, through the first and second ignition timing computing units 54 and 18. However, both portions are different in that the portion 50 controls the ignition timing in the direction of retard angle and the supercharging pressure in the direction of reduction on a real time basis in order to suppress the occurrence of knocks by the detection thereof whereas the portion 52 operates the occurrence rate of knocks by the detection thereof and then displaces the reference ignition timing in the direction of retard angle or advance angle and the reference supercharging pressure in the direction of a reduced or increased pressure thereby to provide a reference ignition timing and a reference supercharging pressure adapted for the octane rating of a fuel used for the engine. Therefore, the responsiveness in displacement of the determining portion 52 toward the advance angle or the retard angle and the reduced pressure or the increased pressure is set more slowly than that of the determining portion 50.

Now the first ignition timing computing unit 54 will be described.

Figure 1:
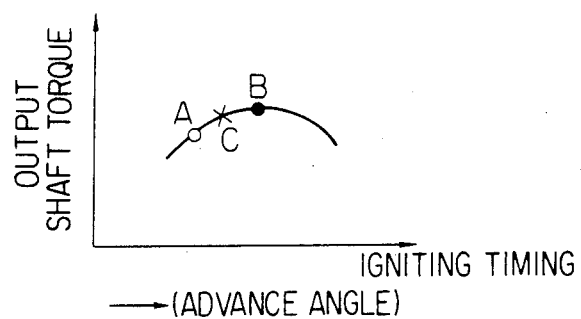
FIG. 1 shows an output shaft torque characteristic of an internal combustion engine as a function of ignition timing.
Figure 2:
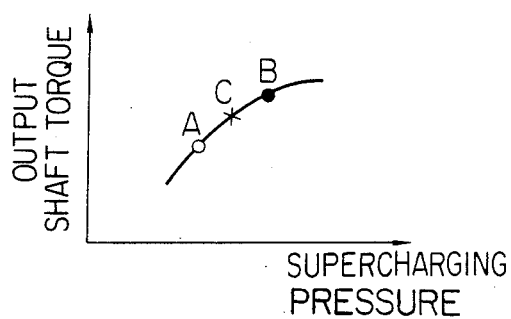
FIG. 2 shows an output shaft torque characteristic as a function of supercharging pressure.

The proportion factor calculator 54a changes the output count of the up/down counter 52d into a proportion factor. Assuming that the proportion factor calculator 54a receives as an input an output count N of the up/down counter 52d, this count N is divided by a maximum preset count value Nmax from the up/down counter 52d, the result being assumed to be a proportion factor k ($=N/Nmax$). Therefore, in the case where the premium gasoline is used, the knock limit point is relatively positioned in the direction of advance angle, and accordingly the count N of the up/down counter 52d will be substantially zero so that the proportion factor k becomes equal to zero. On the other hand, in the case where the regular gasoline is used, the knock limit point is relatively positioned in the direction of retard angle, and accordingly the count N of the up/down counter 52d will be substantially Nmax so that the proportion factor k becomes equal to 1. Further in the case where mixed gasoline of premium and regular gasolines is used, as shown in FIG. 2 by the characteristic curve C, the knock limit characteristic exists between those in the case where premium gasoline is used and in the case where regular gasoline is used so that the count N of the up/down counter 52d assumes a value between zero and Nmax, i.e. $0<N<Nmax$, thereby $0<k<1$. Therefore, it can be seen that the proportion factor k indicates the mixture ratio of premium gasoline and regular gasoline.

Meanwhile, the ROM's 11 and 12 receive as inputs an address value corresponding to the engine speed and the engine load from the second ignition timing computing unit 18 and then provides as an output the ignition timing data stored in that address to the interpolator 54b. Assuming that the ignition timing characteristic stored in the ROM 11 be set for the premium gasoline and that the ignition timing data in that address be $\theta_B$, and that the ignition timing characteristic stored in the ROM 12 be set for the regular gasoline and that the ignition timing data in that address be $\theta_A$, the ignition timing characteristic of the ROM 11 is set at the same timing as that of the ROM 12 or toward the advance angle beyond the latter so that $\theta_A < \theta_B$. Hence the interpolator 54b performs the interpolating operation according to the proportion factor k between $\theta_A$ and $\theta_B$. Namely, the operation of $\theta_B - k(\theta_B - \theta_A)$ is performed, the resultant value $\theta_C$ as assumed, having a value divided proportionally by a ratio of $k:(1-k)$ between $\theta_B$ and $\theta_A$. Therefore, it will be found that when premium gasoline is used, $\theta_C = \theta_B$ because $k=0$, when regular gasoline is used, $\theta_C = \theta_A$ because $k=1$, and when a mixture of premium and regular gasolines is used, $\theta_A < \theta_C < \theta_B$ because $0 < k < 1$. Therefore, $\theta_C$ has a value proportionally divided between $\theta_A$ and $\theta_B$ on the basis of a proportion factor k indicating the mixture ratio of premium and regular gasolines so that even though a mixture of premium and regular gasolines is used, an optimum reference ignition timing can be provided according to the mixture ratio of premium high-octane gasoline and regular low-octane gasoline, by means of the above interpolation.

Furthermore, in the first ignition timing computing unit 54, the subtractor 54c subtracts from the output value $\theta_C$ of the interpolator 54b the output value $\theta_D$ of the A/D converter 50b in the retard angle control magnitude determining portion 50 to provide as an output therefrom the ignition timing data of $\theta_E (=\theta_C - \theta_D)$ to the second ignition timing computing unit 18. Namely, the subtractor 54c performs a retard angle correction for the reference ignition timing by subtracting the retard angle control magnitude from the optimum reference ignition timing obtained by the interpolator 54b in order to suppress knocks occurring during a transient operation of the engine or at a time of rapid transition of the environmental condition.

The second ignition timing computing unit 54 computes an ignition timing from the ignition timing data (the output value of the subtractor 54c) on the basis of the output of the crank angle sensor 16 to provide as an output therefrom an ignition signal. This art is well known in the art of an ignition timing control so that the description thereof will not be repeated.

On the other hand, the supercharging pressure control portion 70 performs the same operation as the ignition timing computing unit 54 as set forth above. Therefore, the proportion factor calculator 70a provides as an output therefrom the same proportion factor k as the proportion factor calculator 54a.

Now assuming that input supercharging pressure data into the interpolator 70b from the ROM's 71 (low-octane) and 72 (high-octane) be $P_B$ and $P_A$ respectively, since the supercharging pressure characteristic stored in the ROM 71 is preset to be the same as or to be higher than that stored in the ROM 72, it is given that $P_A \leq P_B$.

The interpolator 70b performs the interpolation operation of the equation: $P_C = P_B - k(P_B - P_A)$, $P_C$ being provided as an output. The subtractor 70c subtracts, from the output value $P_C$ of the interpolator 70b, the output supercharging pressure value $P_D$, which corresponds to the ignition timing data $\theta_D$ as described above, of the A/D converter 50b of the retard control angle determining portion 50 to provide as an output the resultant supercharging pressure data $P_E(=P_C - P_D)$ to the driver 73 which actuates the actuator 74 which further control the waste gate valve 75 as shown in FIG. 3.

Thus, from the optimum reference supercharging pressure provided by the interpolator 70b, is subtracted a reduction magnitude of supercharging pressure for suppressing knocks occurring during a transient operation of engine or at a time of rapid transition of environmental condition, thereby correcting the reference supercharging pressure.

In this embodiment, the proportion factor calculator 70a may be omitted and instead the output of the proportion factor calculator 54a may be connected to the interpolator 70b.

Next, a second embodiment of this invention will now be described with reference to FIGS. 7 and 8.

Figure 7:
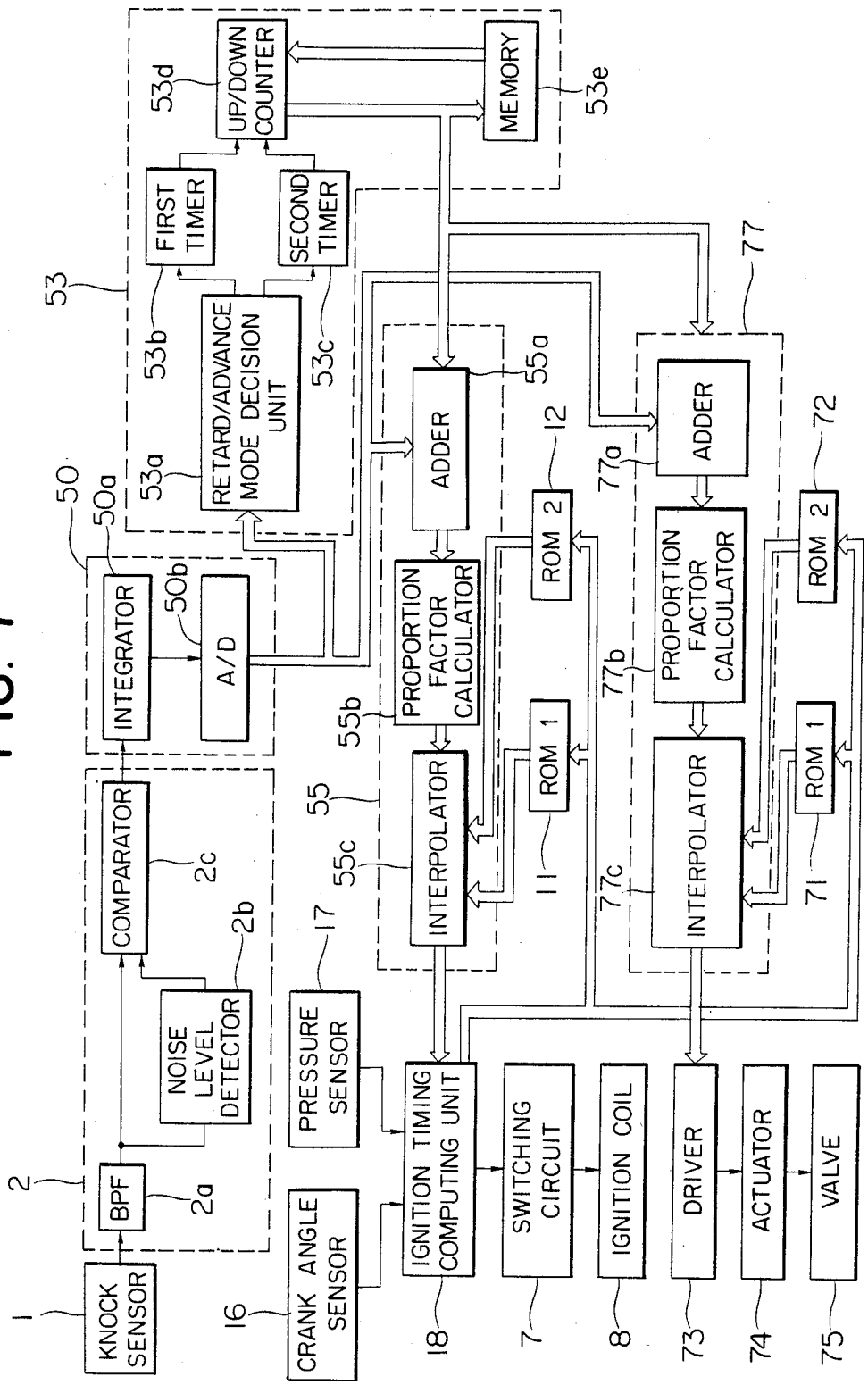
FIG. 7 shows a block diagram of an arrangement of a second embodiment of a control apparatus for an internal combustion engine in accordance with this invention.

This second embodiment shown in FIG. 7 is different from the first embodiment in the arrangement of the reference ignition timing displacement magnitude determining portion, and of the first ignition timing computing unit as well as of the supercharging pressure control portion, and in connection with the retard angle control magnitude determining portion, the reference ignition timing displacement magnitude determining portion, and of the first ignition timing computing unit. Therefore, the description of the portions or elements denoted by the same reference numerals in both embodiments will not be repeated.

In FIG. 7, the reference ignition timing displacement magnitude determining portion 53 is formed of a retard-/advance mode decision unit 53a, a first timer 53b, a second timer 53c, an up/down counter 53d which may be the same as the up/down counter 52d, and a memory 53e which may be the same as the memory 52f; and the first ignition timing computing unit 55 is formed of an adder 55a, a proportion factor calculator 55b which may be the same as the calculator 54a, and an interpolator 55c which may be the same as the interpolator 54b.

The retard/advance mode decision unit 53a has one input terminal connected to the output terminal of the retard angle control magnitude determining portion 50 to receive the output of the A/D converter 50b and has two output terminals one of which is, as a retard mode output (reduced supercharging pressure), connected to the first timer 53b and the other of which is, as an advance mode output (increased supercharging pressure), connected to the second timer 53c, thereby comparing the output value of the A/D converter 50b with a predetermined value and consequently providing the retard (reduced) mode output or the advance (increased) mode output.

The output terminals of the timers 53b and 53c are respectively connected to the up-count input terminal and the down-count input terminal of the up/down counter 53d. The input terminal of the memory 53e is connected to the output terminal of the up/down counter 53d while the output terminal of the memory 53e is connected to the preset input terminal.

The adder 55a has two input terminals one of which is connected to the output terminal of the reference ignition timing displacement magnitude determining portion 53, namely, the output terminal of the up/down counter 53d and the other of which is connected to the output terminal of the retard angle control magnitude determining portion 50, namely, or the output terminal of the A/D converter 50b. The output terminal of the adder 55a is connected to the input terminal of the proportion factor calculator 55b. The interpolator 55c receives as inputs thereto output data of the ROM's 11 and 12 as well as the output value of the proportion factor calculator 55b while providing as an output therefrom the calculated result to the second ignition timing computing unit 18.

It will be seen from FIGS. 3 and 7 that while in the first embodiment the output of the comparator 2c is connected to the inputs of the integrator 50 as well as the pulse generator 52a, in the second embodiment the output of the comparator is only connected to the input of the integrator 50a.

Also in this embodiment of this invention, in addition to the ignition timing control the supercharging pressure is reduced to suppress the occurrence of knocks by means of a supercharging pressure controller 77, ROM's 71 and 72, a driver 73, an actuator 74, and a waste gate valve 75 which are the same as the corresponding elements denoted by the same reference numerals in the first embodiment shown in FIG. 3 so that the description of the corresponding portions and elements denoted by the same reference numerals will not be repeated.

Figure 8:
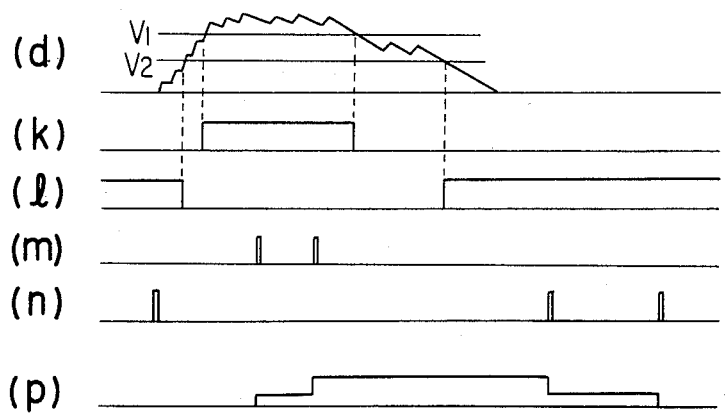
FIGS. 8(d), 8(k)-(n) and 8(p) show waveform diagrams taken out of the various places of the reference ignition timing displacement magnitude determining portion shown in FIG. 7; and, FIG. 9 shows a diagram for explaining the output modes of the retard/advance (reduced/increased pressure) mode decision unit shown in FIG. 7.

FIG. 8 shows various waveforms in the operation of the reference ignition timing (supercharging pressure) displacement magnitude determining portion 53 shown in FIG. 7. FIG. 8(d) shows the output voltage of the integrator 50a which is converted into a digital value by the A/D converter 50b. The retard/advance (reduced-/increased pressure) mode decision unit 53a has two reference values to be compared with its input value, one of which is a retard (reduced pressure) mode decision reference (V1) and the other of which is an advance (increased) mode decision reference (V2), whereby the output value of the A/D converter 50b is compared with the retard (reduced) mode decision reference and the advance (increased) mode decision reference.

Figure 9:
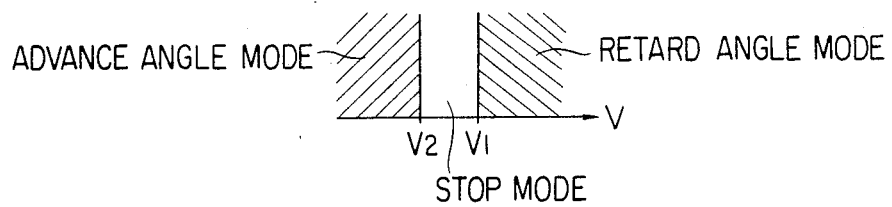

FIG. 9 shows the output modes of the decision unit 53a. Now, when the output value V of the A/D converter 50b is above the retard (reduced) mode decision reference V1, the decision unit 53a assumes the retard angle (reduced pressure) mode, thereby rendering the retard (reduced) mode output thereof at a high logic level as shown in FIG. 8(k) while when the output value of the A/D converter 50b is below the advance (increased) mode decision reference V2, the decision unit 53a assumes the advance angle mode, thereby rendering the advance (increased) mode output thereof at the high level as shown in FIG. 8(l). When the output value of the A/D converter 50b is intermediate between the references V1 and V2, the decision unit 53a assumes a stop mode where the retard (reduced) mode output and the advance (increased) mode output are at a low logic level.

While the retard (reduced) mode output of the decision unit 53a is at the high level, the timer 53b provides as an output therefrom one pulse per a predetermined time interval as shown in FIG. 8(m). While the advance (increased) mode output of the decision unit 53a is at the high level, the timer 53c provides as an output therefrom one pulse per a predetermined time interval as shown in FIG. 8(n).

FIG. 8(p) shows the count of the up/down counter 53d which up-counts the output pulses of the timer 53b and down-counts the output pulses of the timer 53c. Therefore, when the output value of the A/D converter 50b is greater than the retard (reduced) mode decision reference V1, the retard angle (reduced pressure) mode appears, thereby up-counting the count of the up/down counter 53d, when the output value of the A/D converter 50b is smaller than the advance angle (increased pressure) reference V2, the advance angle (increased pressure) mode appears, thereby down-counting the count of the up/down counter 53d, and when the output value of the A/D converter 50b is intermediate between the references V1 and V2, the stop mode appears, thereby retaining the current count of the up/down counter 53d.

As to the operation of the first ignition timing computing unit 55, the adder 55a adds the output value of the A/D converter 50b with the output value of the up/down counter 53d. It is repeated that the output value of the A/D converter 50b or the retard angle control magnitude determining portion 50 indicates a retard control angle and a reduced supercharging pressure for suppressing knocks on the real time basis while the output value of the up/down counter 53d or the reference ignition timing (supercharging pressure) displacement magnitude determining portion 53 indicates a regulating value for the reference ignition timing (supercharging pressure) according to the octane rating of the fuel in use. Therefore, the adder 55a provides as an output therefrom the sum of the retard control angle and the regulating value for the reference ignition timing. Then, the proportion factor calculator 55b converts the output value of the adder 55a into a corresponding proportion factor according to which the interpolator 55c interpolates the ignition timing data of the ROM's 11 and 12 as in the first embodiment of this invention.

The supercharging pressure controller 77 performs the same operation as the first ignition timing computing unit 54 and comprises an adder 77a, a proportion factor calculator 77b, and an interpolator 77c which respectively perform the same function as the adder 54a, the proportion factor calculator 54b, and the interpolator 54c of the unit 54. The adder 77a has two inputs one of which is connected to the output of the up/down counter 53d along with the adder 54a and the other of which is connected to the output of the A/D converter 50b along with the adder 54a, and has an output which is connected through the proportion factor calculator 77b to the interpolator 77c having two inputs one of which is connected to the ROM 71 and the other of which is connected to the ROM 72. The inputs of the ROM's 71 and 72 are commonly connected to the output of the second ignition timing computing unit 18. The output of the subtractor 77c is connected to the driver 73.

As noted above, the input signal from the A/D converter 50b to the adder 77a serves not only as a retard control angle signal but also as a control voltage signal for reducing the supercharging pressure, by means of a conversion from an ignition timing indicative signal to a supercharging pressure indicative signal, in order to suppress knocks on a real time basis while the input signal from the up/down counter 53d to the adder 77a serves not only as a displacement magnitude for the reference ignition timing but also as a displacement magnitude for reducing the reference supercharging pressure according to the octane rating of a fuel in use, by means of a conversion from an ignition timing indicative signal to a supercharging pressure indicative signal.

It is to be noted that the retard/advance mode decision unit 53a also serves as a pressure reduction/increase mode decision unit according to the output of the A/D converter 50b.

Therefore, the adder 77a provides as an output the sum of the reducing control pressure and the regulated magnitude for the reference supercharging pressure. The proportion factor calculator 77b then converts the output value of the adder 77a into the corresponding proportion factor according to which the supercharging pressure data from the ROM's 71 and 72 is interpolated as described above.

Thus, in this embodiment, the reference value displacement magnitude determining portion 53 determines the retard or advance mode and the pressure reduction or pressure increase, and determines a displacement magnitude for the reference ignition timing, whereby an ignition timing control as well as a supercharging pressure control are performed on the basis of the summed output of both portions 50 and 53.

Thus, in this embodiment, the reference ignition timing displacement magnitude determining portion 53 decides whether the retard (reduced) mode or the advanced (increased) mode should be selected, on the basis of the output value of the determining portion 50, and determines a regulating value for the reference ignition timing (supercharging pressure), whereby an ignition timing calculation is made on the basis of the output values of the determining portion 50 and 53.

It is to be noted that while in the above first and second embodiments, a supercharging pressure control has been dealt with, other operating parameters for the engine such as a compression ratio, and an air/fuel ratio may be also applicable. It is also to be noted that the reference ignition timing displacement magnitude determining portion can be exchanged by the first ignition timing computing unit between the above first and second embodiments.

If the supercharging pressure control portion has a slow responsiveness to suppress knocks on the real time basis depending upon the kind of actuator or waste gate valve used, the subtractor or the adder may be omitted to perform the control only with respect to the output of the reference value displacement determining portion.

As described above, according to the first and second embodiments of this invention, in the case where a mixture of the high-octane premium gasoline and the low-octane regular gasoline is used for the engine, a knock sensor detects knock signals on the basis of which a displacement magnitude for the reference ignition timing and reference supercharging pressure is calculated to automatically regulate the reference ignition timing and the reference supercharging pressure at an optimum ignition timing and an optimum supercharging pressure, and further during a transient operation of the engine or at a time of rapid transition of the environmental conditions, the ignition timing is controlled in the direction of retard angle while the supercharging pressure is controlled in the direction of reduction on the real time basis, thereby immediately suppressing the occurrence of knocks and maximizing the output of an engine.

It should be also noted that this invention is not limited to the embodiments described above but various modification can be made without departing from the spirit of this invention.

We claim:

1. A control apparatus for an internal combustion engine having a reference ignition timing comprising:
    a sensing means for sensing vibrations including knocks of said engine;
    a knock signal deriving means for deriving knock signals from the output of said sensing means;
    a correction magnitude determining means for determining from said knock signals derived by said knock signal deriving means an ignition timing correction magnitude for suppressing the occurrence of knock;
    a displacement magnitude determining means for determining from at last one of an output of said knock signal deriving means and an output of said correction magnitude determining means a displacement magnitude for said reference ignition timing corresponding to the octane rating of a fuel used in said engine;
    ignition timing determining means for setting the reference ignition timing at an optimum ignition timing angle for said engine responsive to the correction magnitude determined by said correction magnitude determining means and the displacement magnitude determining by said displacement magnitude determining means; and
    operating parameter control means for controlling an operating parameter of said engine in addition to the ignition timing of said engine in response to at least one of said correction magnitude and said displacement magnitude.

2. A control apparatus for an internal combustion engine according to claim 1 wherein said operating parameter comprising a supercharging pressure.

3. A control apparatus for an internal combustion engine according to claim 1 wherein said ignition timing determining means includes a first interpolating operation means for performing an interpolating operation between two reference ignition timing characteristics according to a proportional factor corresponding to the octane rating of said fuel.

4. A control apparatus for an internal combustion engine according to claim 3 wherein said operating parameter control means includes a second interpolating operation means for performing an interpolating operation between two reference characteristics for said operating parameter according to a proportional factor corresponding to the octane rating of said fuel.

5. A control apparatus for an internal combustion engine according to claim 4 wherein said knock sensing means comprises a vibration acceleration sensing means.

6. A control apparatus for an internal combustion engine according to claim 5 wherein said knock signal deriving means comprises a bandpass filter connected to said sensing means for passing therethrough an output having only a frequency component inherent in the knocks comprising a noise component and a knock component, a noise level detector for converting said output of said bandpass filter into a DC voltage with a predetermined amplification, said DC voltage being higher than the noise component while lower than the knock component of the filtered output, and a comparator for comparing the outputs of said filter and said noise level detector to derive said knock signals.

7. A control apparatus for an internal combustion engine according to claim 6 wherein said correction magnitude determining means comprises an integrator for integrating an output of said knock signal deriving means, and an A/D converter connected to said integrator.

8. A control apparatus for an internal combustion engine according to claim 7 wherein said displacement magnitude determining means comprises a pulse generator connected to said comparator to generate one pulse per occurrence of knock for one ignition, a counter connected to said pulse generator to count output pulses of said generator and to provide a logic signal indicating the presence of a predetermined knock occurrence rate per a first predetermined time interval set by a first timer, an up/down counter for counting up by one when said logic signal changes and for counting down by one for every second predetermined time interval set by a second timer, said second time interval being longer than said first predetermined time interval.

9. A control apparatus for an internal combustion engine according to claim 7 wherein said displacement magnitude determining means includes an advance/retard decision unit connected to said A/D converter for comparing the output of said A/D converter with a predetermined value to provide as outputs therefrom an advance control signal and a retard control signal according to the compared result, first and second timers connected to said decision unit to receive said advance and retard control signals, respectively, and an up/down counter for counting up and down, respectively, from said first and second timers.

10. A control apparatus for an internal combustion engine according to claim 4 wherein said ignition timing determining means comprises first and second storages for respectively storing first and second ignition timing characteristics for a high-octane and a low-octane rating fuels respectively, an engine speed detecting means, a load condition detecting means, and an ignition timing computing unit for converting ignition timing data, determined by an engine speed detected by said engine speed detecting means and by a load condition detected by said load condition detecting means, into corresponding address data and for sending the address data to said first and second storages.

11. A control apparatus for an internal combustion engine according to claim 10 further comprising third and fourth storages for respectively storing first and second operating parameter characteristics for a high-octane and a low-octane rating fuels respectively.

12. A control apparatus for an internal combustion engine according to claim 11 wherein said first interpolating operating means includes means for providing a proportional factor corresponding to the octane rating of said fuel based on a knock occurrence rate indicated by said displacement magnitude determining means, an interpolator for performing an interpolating operation according to said proportional factor between the first and second ignition timing characteristics respectively stored in said first and second storages, and a subtractor for subtracting said output of said correction magnitude determining means from an output produced by said interpolator.

13. A control apparatus for an internal combustion engine according to claim 12 wherein said second interpolating operation means includes means for providing a proportional factor corresponding to the octane rating of said fuel based on a knock occurrence rate indicated by said displacement magnitude determining means, an interpolator for performing an interpolating operation according to said proportional factor between the first and second operating parameter characteristics respectively stored in said third and fourth storages, and a subtractor for subtracting said output of said correction magnitude determining means from an output produced by said interpolator.

14. A control apparatus for an internal combustion engine according to claim 11 wherein said first interpolating operation means includes an adder for adding the output of said correction magnitude determining means and the output of said displacement magnitude determining means, means for providing a proportional factor corresponding to the octane rating of said fuel based on the output of said adder, an interpolator for performing an interpolating operation according to said proportional factor between the first and second ignition timing characteristics respectively stored in said first and second storages.

15. A control apparatus for an internal combustion engine according to claim 11 wherein said second interpolating operation means includes an adder for adding the output of said correction magnitude determining means and the output of said displacement magnitude determining means, means for providing a proportional factor corresponding to the octane rating of said fuel based on the output of said adder, an interpolator for performing an interpolating operation according to said proportional factor between the first and second operating parameter characteristics respectively stored in said third and fourth storages.

* * * * *